United States Patent
Ogasawara et al.

(10) Patent No.: US 9,166,211 B2
(45) Date of Patent: Oct. 20, 2015

(54) COVER MEMBER WITH A PLURALITY OF BUS BARS CONNECTING A PLURALITY OF BATTERIES AND POWER SOURCE HAVING THE SAME

(71) Applicant: Yazaki Corporation, Tokyo (JP)

(72) Inventors: Shigeyuki Ogasawara, Makinohara (JP); Katsunori Sato, Makinohara (JP); Kiyotaka Mochizuki, Shimada (JP)

(73) Assignee: Yazaki Corporation, Tokyo (JP)

( * ) Notice: Subject to any disclaimer, the term of this patent is extended or adjusted under 35 U.S.C. 154(b) by 442 days.

(21) Appl. No.: 13/674,469

(22) Filed: Nov. 12, 2012

(65) Prior Publication Data

US 2013/0071721 A1 Mar. 21, 2013

Related U.S. Application Data

(63) Continuation of application No. PCT/JP2011/059060, filed on Apr. 12, 2011.

(30) Foreign Application Priority Data

May 13, 2010 (JP) .................................. 2010-110926

(51) Int. Cl.
  *H01M 2/04* (2006.01)
  *H01M 2/10* (2006.01)
  *H01M 2/20* (2006.01)

(52) U.S. Cl.
  CPC ............ *H01M 2/043* (2013.01); *H01M 2/1077* (2013.01); *H01M 2/1083* (2013.01); *H01M 2/206* (2013.01)

(58) Field of Classification Search
  CPC ..... H01M 2/043; H01M 2/04; H01M 2/1077; H01M 2/1083; H01M 2/1072; H01M 2/206; H01M 2/0245; H01M 2/1016
  See application file for complete search history.

(56) References Cited

U.S. PATENT DOCUMENTS

| | | |
|---|---|---|
| 6,261,719 B1 | 7/2001 | Ikeda et al. |
| 2001/0049055 A1 | 12/2001 | Saito |
| 2009/0053591 A1 | 2/2009 | Ikeda et al. |

FOREIGN PATENT DOCUMENTS

| | | | |
|---|---|---|---|
| JP | 2000-149909 A | 5/2000 | |
| JP | 2001-332235 | * 11/2001 | .............. H01M 2/10 |

(Continued)

OTHER PUBLICATIONS

International Search Report dated Jul. 19, 2012, issued for PCT/JP2011/059060.

(Continued)

*Primary Examiner* — Raymond Alejandro
(74) *Attorney, Agent, or Firm* — Locke Lord LLP; James E. Armstrong, IV

(57) ABSTRACT

A cover member is attached to a bus bar module. The bus bar module includes: a plurality of bus bars respectively connecting batteries adjacent to each other of a battery assembly composed of a plurality of batteries overlapped with each other; a main body to which the bus bars are attached, and overlapped with the battery assembly; a plurality of positioning projections and a plurality of locking portions provided on the main body. The cover member includes: a plurality of cover portions arranged in parallel to an overlapping direction X of the batteries, and covering the bus bars; and a plurality of elastically deforming portions movably connecting the cover portions adjacent to each other. Each of the cover portions includes: a positioning hole into which the positioning projection is inserted; and a lock receiving portion with which the locking portion is locked.

7 Claims, 6 Drawing Sheets

(56) References Cited

FOREIGN PATENT DOCUMENTS

| | | | |
|---|---|---|---|
| JP | 2001-332235 | A | 11/2001 |
| JP | 2006-269103 | A | 10/2006 |
| JP | 2009-277420 | A | 11/2009 |
| JP | 2010-170884 | A | 8/2010 |

OTHER PUBLICATIONS

Office Action dated Jan. 21, 2014, issued for the corresponding Chinese Patent Application No. 201180004194.7 and English translation thereof.

\* cited by examiner

COVER MEMBER WITH A PLURALITY OF BUS BARS CONNECTING A PLURALITY OF BATTERIES AND POWER SOURCE HAVING THE SAME

TECHNICAL FIELD

This invention relates to a power source used in a hybrid vehicle, an electric vehicle, or the like, in particular, to a cover member attached to a bus bar module for connecting a plurality of batteries in series and to the power unit having the cover member.

BACKGROUND ART

A power source as a driving source of an electric motor is mounted on an electric vehicle running with the electric motor, a hybrid vehicle running with both an engine and the electric motor, or the like. This power source is composed of a battery assembly made of a plurality of batteries having a positive electrode at one end and a negative electrode at the other end overlapped with each other in a manner that the positive electrode and the negative electrode are adjacent to each other, a bus bar module overlapped with a wall on which the positive and negative electrodes of the battery assembly are provided, and a cover member attached to the bus bar module.

The bus bar module includes: a plurality of bus bars connecting the positive and negative electrodes of the batteries adjacent to each other of the battery assembly; and a connection case which can install the bus bars in the battery assembly in a lump by attaching the bus bars and by overlapping with a wall on which the positive and negative electrodes of the battery assembly are provided. Then, while the polarity of batteries of the battery assembly are connected in series, the bus bar module is attached to the battery assembly by overlapping the connection case with the wall on which the positive and negative electrodes of the battery assembly are provided, and by connecting the positive and negative electrodes of the batteries adjacent to each other of the battery assembly with the bus bars.

Then, as the cover member described above, for example, a cover member attached to the connection case of the bus bar module for isolating the positive and negative electrodes of each battery and the bus bars from an outside has been proposed (For example, see Patent Document 1).

The cover member disclosed in the Patent Document 1 includes: a cover main body made of synthetic resin and the like and formed in substantially a plate shape in a plan view; and a pair of open-close portions connected to both ends of the cover main body in a longitudinal direction via a hinge. The cover main body and the pair of open-close portions are provided with a plurality of locking claws arranged along the longitudinal directions with gaps between them. Then, when the locking claws are respectively locked with corresponding projections, the cover main body and the pair of open-close portions are respectively fixed to the connection case.

When the locking claws provided on the cover main body and the pair of open-close portions is respectively locked with the projections provided on the connection case of the bus bar module, the cover member having the above-described configuration is attached to the connection case of the bus bar module. Then, the cover member can respectively open/close the pair of open-close portions connected to the cover main body via the hinge by engaging or releasing the locking claws of the pair of open-close portions with the projections of the connection case. Therefore, electric wires for outputting the voltage of the battery assembly to an outside can be safely connected to respective ends of the bus bars disposed at both ends of the connection case in the longitudinal directions.

PRIOR ART DOCUMENT PATENT DOCUMENT

Patent Document 1: JP, A, 2001-332235

DISCLOSURE OF THE INVENTION

Problem to be Solved by the Invention

However, because the number of the batteries is increased with an increase of voltage, a cumulative tolerance (a tolerance generated by accumulating tolerances of respective batteries) of a current battery assembly is larger than that of a conventional one. Therefore, when an elastic portion or the like for absorbing the tolerance is provided on the connection case of the bus bar module with which the battery assembly is overlapped, a length of the connection case is changed by the elastic portion or the like, and along with this, gaps between the projections are changed. Therefore, when the cover member disclosed in the Patent Document 1 is attached to this connection case, respective locking claws of the cover main body and the pair of open-close portions of the cover member are dislocated with respect to the projections of the connection case. Thereby, the locking claws are hard to be locked with the projections, and there is a problem that workability at the attachment of the cover member is reduced.

Accordingly, in view of the above-described problem, an object of the present invention is to provide a cover member and a power source having the cover member which is allowed to be easily attached even when a length of the bus bar module is varied.

Means for Solving the Problem

For attaining the object, according to inventive concepts, there is provided a cover member attached to a bus bar module which comprises:

a plurality of bus bars connecting a plurality of batteries in series by connecting batteries adjacent to each other of a battery assembly composed of the batteries overlapped with each other; a main body to which the bus bars are attached, and overlapped with the battery assembly; a plurality of positioning projections projected from the main body; and a plurality of locking portions provided on the main body, said cover member comprising: a plurality of cover portions arranged in parallel to an overlapping direction of the batteries, and covering the bus bars; and a plurality of elastically deforming portions movably connecting the cover portions adjacent to each other, wherein each of said cover portions comprises: a positioning hole into which each of the positioning projection is inserted and formed in a shape to allow the positioning projection to be movable in the overlapping direction of the batteries; and a lock receiving portion with which the locking portion is locked. According to the main body of cover member: a plurality of accommodating portions 25 arranged in parallel to the overlapping direction of the batteries and respectively receiving the bus bars; and a plurality of connection portions projected toward the cover member and connecting the accommodating portions adjacent to each other, and wherein the elastically deforming portions respectively include: openings respectively overlapped with the connection portions so as to insert tip ends of the connection portions therethrough when the cover portions cover the bus bars.

According to the inventive concepts, each of cover portions of the cover members may cover the bus bars received in two accommodating portions adjacent to each other, and includes: a concave provided at a wall of the cover portion facing the two accommodating portions so as to insert the tip end of the connecting portion connecting the two accommodating portions.

According to inventive concepts of the invention, there may be provided a power source including: a battery assembly composed of a plurality of batteries overlapped with each other; a bus bar module attached to the battery assembly, and connecting the batteries of the battery assembly in series; and a cover member as described above, attached to the bus bar module.

According to aspects of the invention, because the cover portions arranged in parallel to an overlapping direction of the batteries, and covering the bus bars are movably connected to each other by the elastically deforming portions, even when gaps between the locking portions provided on the main body are varied due to a variation of the length of the main body of the bus bar module, the cover portions can be respectively moved in the overlapping direction of the batteries of the battery assembly according to these variations.

Further, because each of said cover portions includes: a positioning hole into which the positioning projection of the bus bar module is inserted and formed in a shape to allow the positioning projection to be movable in the overlapping direction of the batteries; and a lock receiving portion with which the locking portion of the bus bar module is locked, while the locking portion and the positioning projection provided on the main body are engaged with one cover portion, even when a gap between the locking portion and the positioning projection engaged with the one cover portion is varied, the positioning projection can be moved in the positioning hole according to the variation. Therefore, a tolerance can be absorbed without a complex structure such as an elastically deforming portion allowing the lock receiving portion and the positioning hole to be movable provided on the one cover portion, the locking portion and the lock receiving portion are correctly locked with each other, and easily attached to the bus bar module.

Further, when the cover member is attached to the bus bar module mounted on the battery assembly having a large cumulative tolerance, the tolerance can be absorbed not only by the elastically deforming portions connecting the cover portions movably but also by the positioning holes of the cover portions. Therefore, the number of the elastically deforming portions can be reduced, and a shape of the cover member can be prevented from being complex.

According aspects of the invention, because the elastically deforming portions respectively include: openings respectively overlapped with the connection portions connecting the bus bar accommodating portions adjacent to each other respectively accommodating the bus bars and into which tip ends of the connection portions are respectively inserted when the cover portions cover the bus bars, a height of the cover member attached to the bus bar module can be reduced.

According to aspects of the invention, because each of the cover portions includes: a concave covering the bus bar received in two accommodating portions adjacent to each other of the accommodating portions, and having a wall facing the two accommodating portions which a tip end of the connecting portion connecting the two accommodating portions enters, the height of the cover member attached to the bus bar module can be further reduced.

According to aspects of the invention, because the power source includes: the cover member discussed above, the cover member can be easily attached to the bus bar module mounted on the battery assembly having a large cumulative tolerance, and the assembling workability can be improved. Further, because a shape of the cover member can be prevented from being complex, a cover member is easily produced and the production cost of the cover member can be reduced, a production cost of the power source can be reduced. Further, because the height of the cover member attached to the bus bar module can be reduced, the power source can be downsized.

Effects of the Invention

As explained above, according to aspects of the invention; even when the length of the bus bar module is varied for absorbing the tolerance, and a position gap is generated between the lock receiving portion of the cover portion and the locking portion of the bus bar module, the locking portion and the lock receiving portion are easily locked with each other by moving the cover portion in the overlapping direction of the batteries of the battery assembly. Therefore, the cover member can be attached easily to the bus bar module mounted on the battery assembly having a large cumulative tolerance. Further, when the cover member is attached to the bus bar module mounted on the battery assembly having a large cumulative tolerance, the tolerance is absorbed not only by the elastically deforming portions connecting the cover portions movably but also by the positioning holes of the cover portions. Therefore, the number of the elastically deforming portions can be reduced, and a shape of the cover member can be prevented from being complex. Therefore, the cover member can be easily produced, and the production cost of the cover member can be reduced.

According to aspects of the invention, a height of the cover member attached to the bus bar module can be reduced.

According to aspects of the invention, the height of the cover member attached to the bus bar module can be further reduced.

According to aspects of the invention, because the power source includes the cover member described above, the cover member can be attached easily to the bus bar module mounted on the battery assembly having a large cumulative tolerance, and the assembling workability can be increased. Further, a shape of the cover member can be prevented from being complex, the cover member can be easily produced, and the production cost of the cover member can be reduced. Thereby, the production cost of the power source can be reduced. Further, because the height of the cover member attached to the bus bar module can be reduced, the power source can be downsized.

Figure 1:
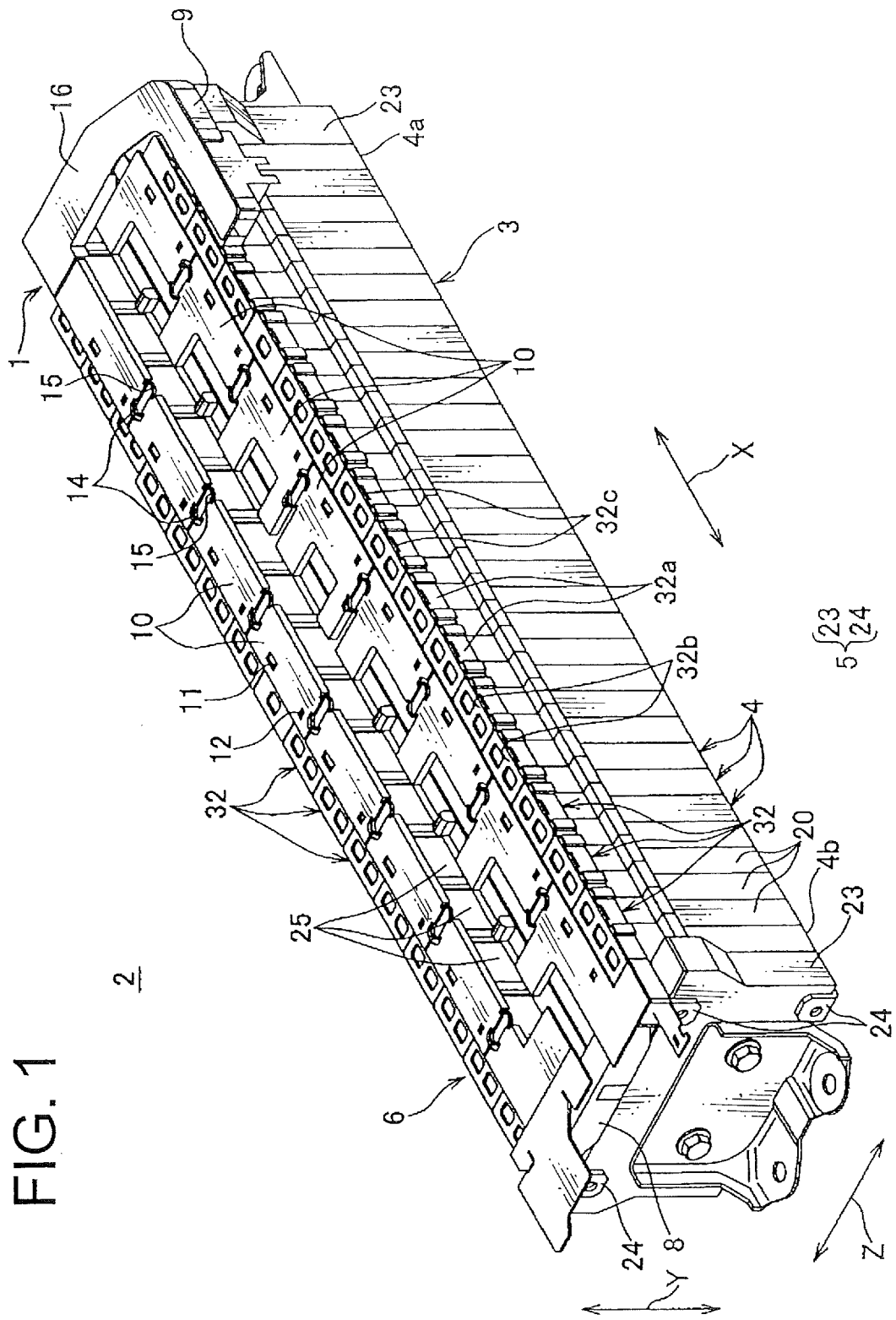
FIG. 1 A perspective view showing a power source having a protective cover according to an embodiment of the present invention.

REFERENCE SIGNS LIST 1 cover member
2 power source
3 battery assembly
4 battery 6 bus bar module
7 bus bar
8 main body
10 cover portion
11 positioning hole
12 lock receiving portion
13 concave
14 elastically deforming portion
15 opening
25 bus bar accommodating portion (accommodating portion)
29 positioning projection
30 locking portion
31 connecting portion
31b arc (tip end)
X arranging direction of a plurality of batteries

DESCRIPTION OF EMBODIMENTS

Hereinafter, a cover member and a power source having the cover member according to an embodiment of the present invention will be explained with reference to FIGS. 1 to 7. A cover member 1 according to an embodiment of the present invention is a component of a power source 2 shown in FIG. 1. This power source 2 is mounted on an electric vehicle running by a driving force of an electric motor, a hybrid vehicle running by both driving forces of an engine and the electric motor, or the like, and supplies electric power to the electric motor.

As shown in FIG. 1, the power source 2 includes: a battery assembly 3; a pair of electric wires (not shown) for outputting a voltage of the battery assembly 3 to an outside; a bus bar module 6 attached to the battery assembly 3; and the cover member 1 attached to the bus bar module 6. The battery assembly 3 includes: a plurality of batteries 4; and a fixing member 5 for overlapping and fixing (bundling and fixing) the batteries 4.

Figure 2:
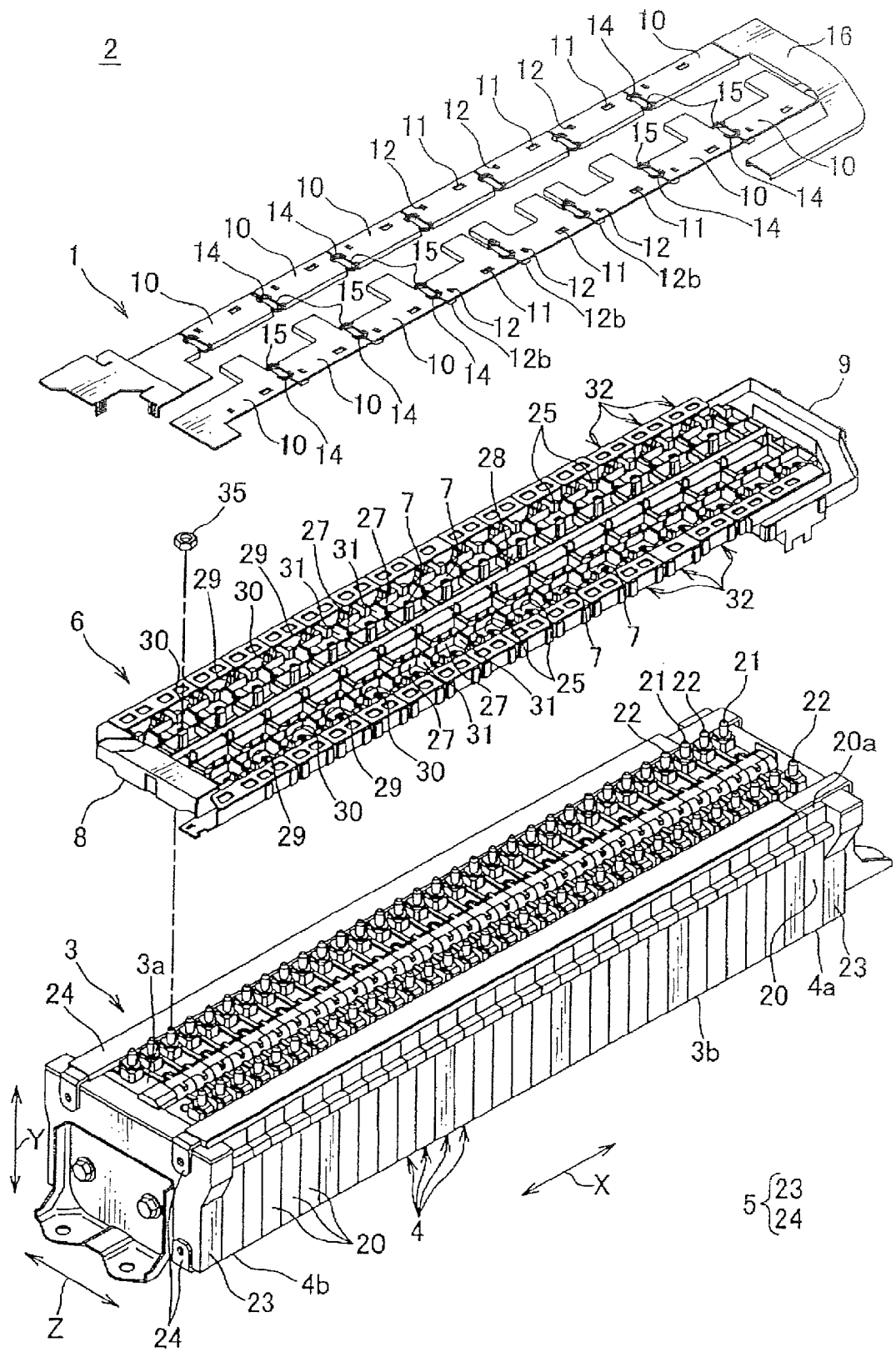
FIG. 2 An exploded perspective view showing the power source shown in FIG. 1.

As shown in FIG. 2, each of the batteries 4 includes: a box-shaped battery main body 20; a positive electrode 21 projected from one end of one wall 20a of the battery main body 20; and a negative electrode 22 projected from the other end of the one wall 20a. Each of the positive and negative electrodes 21, 22 is made of conductive metal, and formed in a cylinder shape. The positive and negative electrodes 21, 22 are projected toward the same direction from the one wall 20a of the battery main body 20, and arranged in parallel to each other. As shown in FIG. 2, the batteries 4 are overlapped with each other in one direction (an arrow X direction in FIG. 1) in a manner that the positive and negative electrodes 21, 22 of the batteries 4 adjacent to each other are arranged adjacent to each other, while the one walls 20a of the batteries 4 are arranged in the same plane. Namely, the batteries 4 are overlapped with each other in a manner that the positive and negative electrodes are alternately opposite to each other.

The fixing member 5 includes: a pair of end plates 23; and a binding band 24. Each of the pair of end plates 23 is made of insulating material, and formed in a box shape. As shown in FIGS. 1 and 2, the pair of end plates 23 is arranged at both ends in an overlapping direction X of the batteries 4 of the battery assembly 3 to hold the batteries 4 therebetween.

The binding band 24 is made of insulating material, and formed in a band plate shape. A plurality of binding bands 24 (four in FIG. 1) is provided. As shown in FIGS. 1 and 2, the binding bands 24 are arranged on an upper wall 3a as the one wall 20a of the batteries 4 of the battery assembly 3, and on a bottom wall 3b facing the upper wall 3a. The binding band 24 are arranged parallel to the overlapping direction X of the batteries 4, and provided perpendicular to the overlapping direction X of the batteries 4 with gaps to each other.

As shown in FIGS. 1 and 2, the fixing member 5 bundles, namely, unifies the batteries 4 and holds the batteries 4 by holding the batteries 4 between the pair of end plates 23 and by fixing both ends in a longitudinal direction of the binding band 24 to the end plates 23 with such as bolts.

Incidentally, the arrow X in FIG. 1 indicates the overlapping direction of the batteries 4, and the longitudinal direction of the battery assembly 3. An arrow Z indicates a width direction of the battery assembly 3. An arrow Y indicates a height direction of the battery assembly 3.

Each of the not-shown pair of electric wires is a well-known covered wire having a conductive core wire and an insulating cover for covering the core wire. One electric wire of the pair of electric wires is connected to a positive electrode 21 of one battery 4a positioned at one end in the overlapping direction X of the batteries 4 of the battery assembly 3, and the other electric wire is connected to a negative electrode 22 of the other battery 4b positioned at the other end in the overlapping direction X of the batteries 4 of the battery assembly 3. Then, the pair of electric wires outputs a voltage of the batteries 4 connected in series, namely, a voltage of the battery assembly 3 to an outside.

The bus bar module 6 connects the batteries 4 in series, and as shown in FIGS. 1 and 2, includes: a plurality of bus bars 7 connecting the batteries 4 in series by connecting the batteries 4 adjacent to each other of the battery assembly 3; a main body 8 into which the bus bars 7 are attached, and overlapped with the upper wall 3a of the battery assembly 3; and a wire routing portion 9 routing one of the pair of electric wires.

Figure 4:
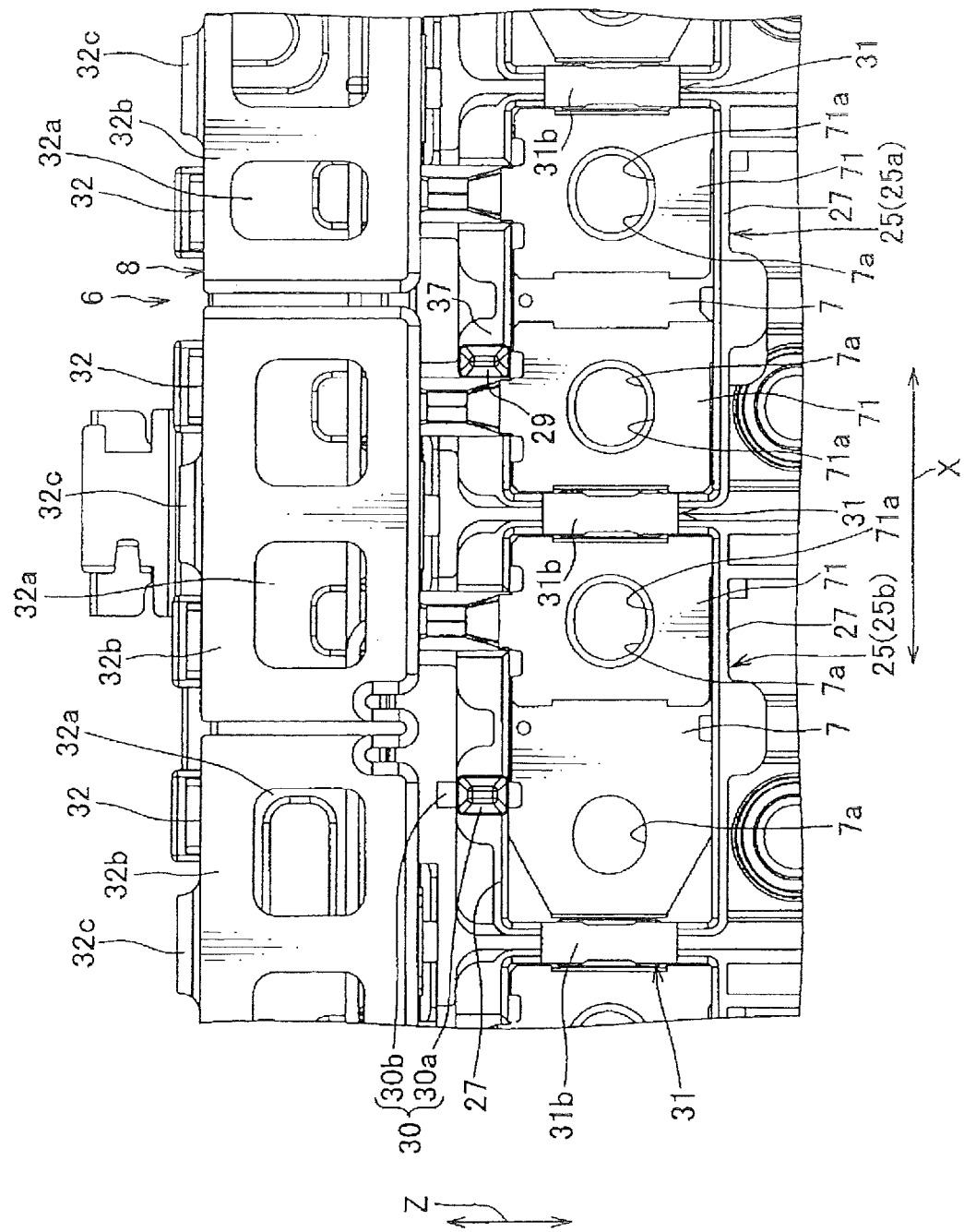
FIG. 4 A partially enlarged plan view showing a bus bar module of the power source shown in FIG. 2.

Each of the bus bars 7 is made by pressing a conductive metal plate or the like, and as shown in FIG. 4, provided with a pair of holes 7a on a band-plate-shaped metal plate. The positive and negative electrodes 21, 22 adjacent to each other of the batteries 4 adjacent to each other are inserted into the pair of holes 7a. The bus bars 7 are fixed to the batteries 4 by screwing the positive and negative electrodes 21, 22 inserted into the holes 7a with nuts 35 (shown in FIGS. 2 and 7). Further, an electric wire for detecting the voltage of each battery 4 (not shown) is connected to each of the bus bars 7 via a terminal 71. The terminal 71 is provided with a hole 71a into which the positive or negative electrode 21, 22 is inserted. The terminal 71 is overlapped with the bus bar 7 so that the hole 71a is coaxial with the hole 7a of the bus bar 7, and fixed to the battery 4 together with the bus bar 7 by the nut 35.

The main body 8 is made of insulating synthetic resin, and as shown in FIGS. 1 and 2, formed in substantially the same as the upper wall 3a of the battery assembly 3 in a plan view. The main body 8 includes: a plurality of bus bar accommodating portions 25 for respectively accommodating the bus bars 7; a plurality of connecting portions 31 for connecting the bus bar accommodating portions 25 adjacent to each other; and a plurality of wire accommodating portions 32 for accommodating the electric wires for detecting the voltage. Incidentally, the bus bar accommodating portions 25 correspond to the accommodating portions discussed above.

As shown in FIGS. 1, 2, and 4, the bus bar accommodating portions 25 are arranged in parallel along the longitudinal direction of the battery assembly 3, namely, the overlapping direction of the batteries 4 with gaps to each other. Two columns of the bus bar accommodating portions 25 are provided in the width direction Z of the battery assembly 3 with a gap to each other, and these two columns are connected to each other with a connection member 28. This connection member 28 is located at the center in the width direction Z of the battery assembly 3, and extended in the longitudinal direction X of the battery assembly 3. Further, the connection member 28 is formed extendable in the longitudinal direction of the battery assembly 3, namely, the overlapping direction X of the batteries 4.

Further, each of the bus bar accommodating portions 25 is formed in a gutter shape with a band-plate-shaped bottom wall 26 of which surface the bus bar 7 is positioned, and a side wall 27 extended vertically from both ends in the width direction (arrow Z direction) of the bottom wall 26. The bottom wall 26 is provided with a pair of through holes 26a respectively overlapped with the pair of holes 7a of the bus bar 7. The positive and negative electrodes 21, 22 respectively inserted into the pair of through holes 26a are inserted into the holes 7a of the bus bar 7.

Figure 3:
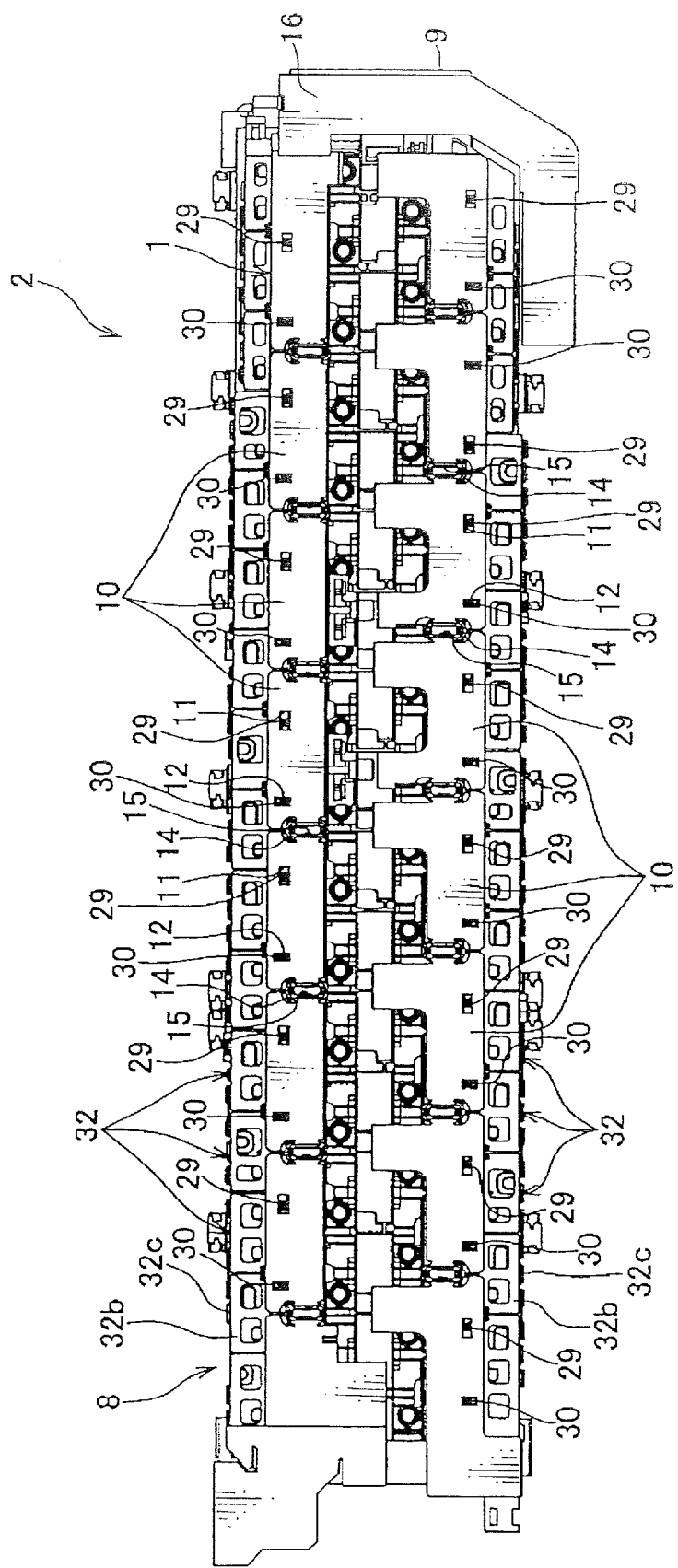
FIG. 3 A plan view of the power source shown in FIG. 1.

As shown in FIG. 3, the bus bar accommodating portion 25 is any one of the bus bar accommodating portion 25 provided with a positioning projection 29 (hereinafter, referred to as "one bus bar accommodating portion 25a") or the bus bar accommodating portion 25 provided with a locking portion 30 (hereinafter, referred to as "the other bus bar accommodating portion 25b"). These one bus bar accommodating portion 25a and the other bus bar accommodating portion 25b make a pair, and are alternately arranged in parallel in the longitudinal direction of the main body 8 (arrow X direction). Namely, the positioning projection 29 and the locking portion 30 are alternately arranged in parallel in the longitudinal direction of the main body 8 (arrow X direction). One cover portion 10 provided on a later-described cover member 1 is overlapped with the pair of bus bar accommodating portions 25 a, 25b so that the cover portion covers the bus bars 7 accommodated in the bus bar accommodating portions 25a, 25b.

The positioning projection 29 is formed in a prism shape, and projected from the side wall 27 at the wire accommodating portion 32 side of the one bus bar accommodating portion 25a toward a direction perpendicular to the bottom wall 26.

The locking portion 30 includes: a prism-shaped projection 30a projected from the side wall 27 at the wire accommodation portion 32 side of the other bus bar accommodating portion 25b toward a direction perpendicular to the bottom wall 26; and an engaging projection 30b (shown in FIGS. 4 and 5) projected from on one side wall at the wire accommodation portion 32 side of the projection 30a.

Figure 5:
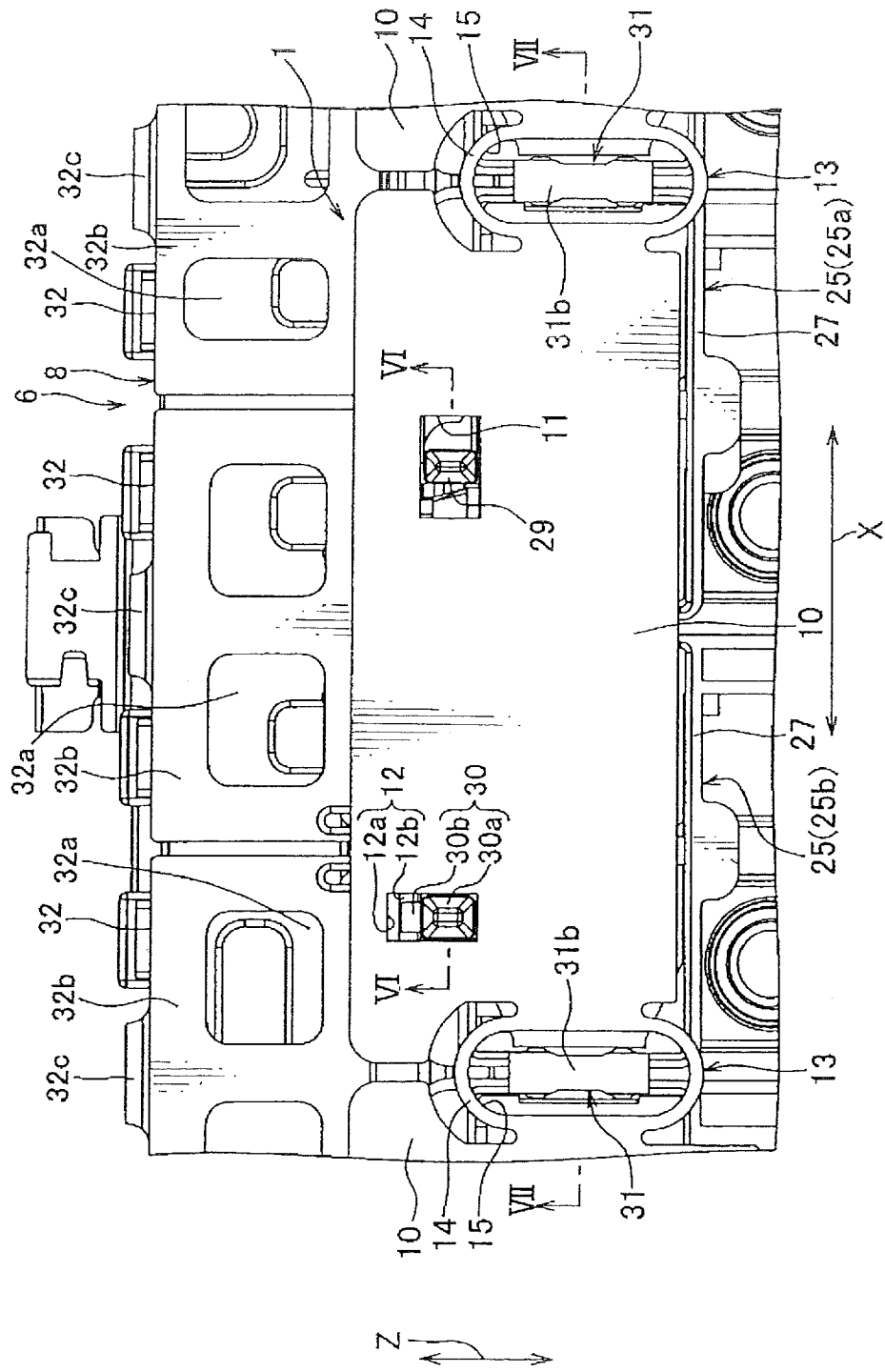
FIG. 5 A partially enlarged plan view of the power source shown in FIG. 3.
Figure 7:
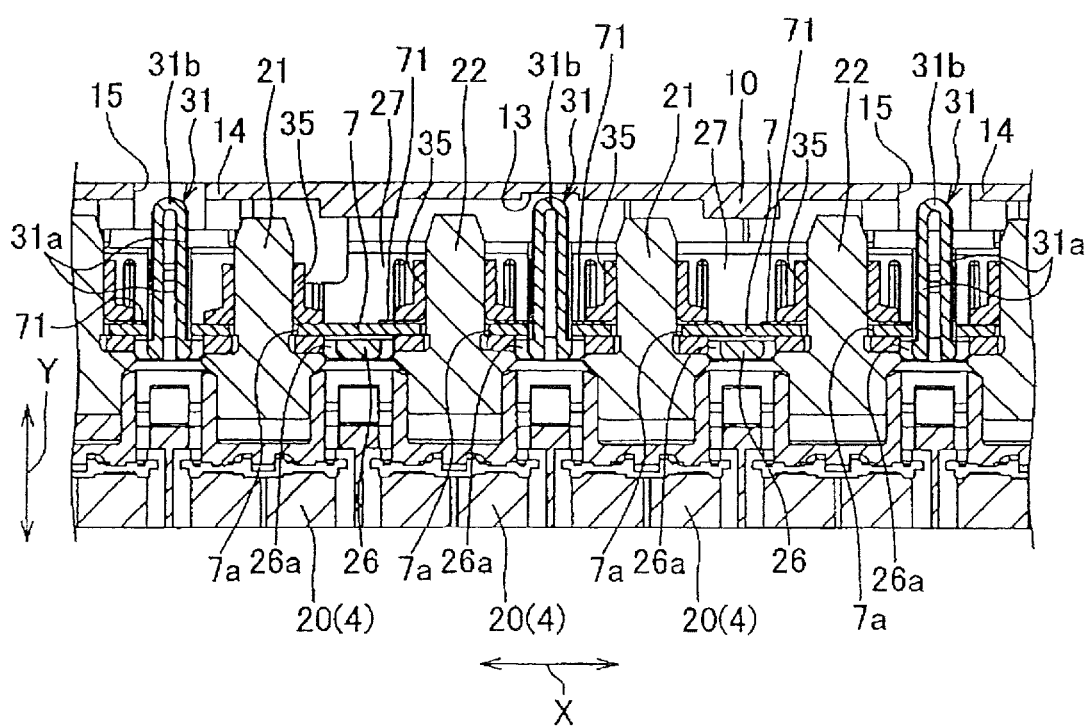
FIG. 7 A sectional view taken on line VII-VII in FIG. 5.

As shown in FIGS. 4, 5, and 7, each of the connecting portions 31 integrally includes; a pair of facing walls 31a facing each other with a gap; and an arc portion 31b connecting both ends of the pair of facing walls 31a and extended in an arc-shape in a sectional view along a side of one end of the pair of facing walls 31a, thereby each of the connecting portions 31 is formed in an inverted U shape in a sectional shape. Each of the other end of the pair of facing walls 31a of the connecting portions 31 is connected to an end in a longitudinal direction (arrow X direction) of the bottom wall 26 of the bus bar accommodating portions 25 adjacent to each other. Further, a height (a length in the arrow Y direction) of the pair of facing walls 31a is substantially the same as a height (a length in the arrow Y direction) of the side wall 27 of the bus bar accommodating portion 25. Namely, the arc portion 31b of the connecting portion 31 is projected from an edge opposite to an edge connected to the bottom wall 26 of the side wall 27 of the bus bar accommodating portion 25.

Further, when the connecting portions 31 are elastically deformed in a manner that the other ends of the pair of facing walls 31a are moved close to or away from each other, the bus bar accommodating portions 25 adjacent to each other are moved in the longitudinal direction of the battery assembly 3, namely, the overlapping direction of the batteries 4. Therefore, when the bus bar accommodating portions 25 adjacent to each other are moved, the gaps between the positioning projections 29 and the locking portions 30 alternately provided on the bus bar accommodating portions 25 arranged in parallel are moved. Incidentally, the arc portion 31b corresponds to the tip end discussed above.

As shown in FIGS. 1 and 2, the wire accommodation portions 32 are arranged in parallel in the longitudinal direction of the main body 8, namely, the arranging direction X of the batteries 4. Further, two columns of the wire accommodation portions 32 are arranged with a gap in the width direction Z of the battery assembly 3 and adjacent to the bus bar accommodating portions 25 in a manner to hold two columns of the bus bar accommodating portions 25 therebetween.

Further, as shown in FIGS. 4 and 5, each of the wire accommodation portions 32 is composed of a bottom wall and a plurality of surrounding walls extended vertically from outer edges of the bottom wall, and includes: a box portion 32a for accommodating a plurality of electric wires for voltage detection; and a cover portion 32b connected to the box portion 32a via a hinge 32c for opening and closing an opening of the box portion 32a. The cover portion 32b prevents the electric wires for voltage detection received in the box portion 32a from falling out. The wire accommodation portions 32 are arranged in parallel with gaps to each other in the overlapping direction X of the batteries 4, and connected to each other movably (namely, flexible in the arrow X direction) with not-shown elastically deforming portions or the like.

As shown in FIGS. 1 and 2, the wire routing portion 9 is formed in a gutter shape, and one end of the wire routing portion 9 is connected to the bus bar accommodating portion 25 and the wire accommodation portion 32 disposed at the one battery 4a side positioned at one end in the longitudinal direction X of the battery assembly 3 of the main body 8.

The one electric wire connected to the positive electrode 21 of the one battery 4a disposed at one end of the batteries 4 arranged in the longitudinal direction X of the battery assembly 3 is positioned in an inside of the wire routing portion 9, and routed from the one end to the other end in the longitudinal direction X of the battery assembly 3 along the battery assembly 3.

As shown in FIGS. 1 and 2, the cover member 1 includes: a plurality of cover portions 10 covering bus bars 7 respectively accommodated in the bus bar accommodating portions 25; a plurality of elastically deforming portions 14 connecting movably the cover portions 10 adjacent to each other; and a lid portion 16 covering an opening of the wire routing portion 9.

As shown in FIGS. 1 and 2, the cover portions 10 are arranged in parallel to each other with gaps to each other in the arranging direction of the bus bar accommodating portions 25, namely, the overlapping direction X of the batteries 4. Further, two columns of the cover portions 10 are arranged with a gap in the width direction of the main body 8, namely, in the width direction Z of the battery assembly 3.

Each of the cover portions 10 is formed in a band plate shape, and a longitudinal direction of the cover portion 10 is disposed parallel to the arranging direction of the bus bar accommodating portions 25, namely, the overlapping direction X of the batteries 4. Each of the cover portions 10 is formed in a length to cover the openings of the two bus bar accommodating portions 25 adjacent to each other (namely, the pair of bus bar accommodating portions 25 a, 25b). Namely, by covering the openings of the two bus bar accommodating portions 25 adjacent to each other with each of the cover portions 10, the cover portions 10 covers the bus bars 7 respectively accommodated in the bus bar accommodating portions 25.

As shown in FIGS. 1 to 3 and 5, each of the cover portions 10 is provided with a positioning hole 11 into which the positioning projection 29 is inserted, a lock receiving portion 12 with which the locking portion 30 is locked, and a concave 13 (shown in FIG. 7). These positioning hole 11 and lock receiving portion 12 are arranged with a gap in the longitudinal direction of the cover portion 10, namely, the arranging direction of the bus bar accommodating portions 25. Namely, the positioning hole 11 and the lock receiving portion 12 are arranged in parallel in the overlapping direction X of the batteries 4.

Figure 6:
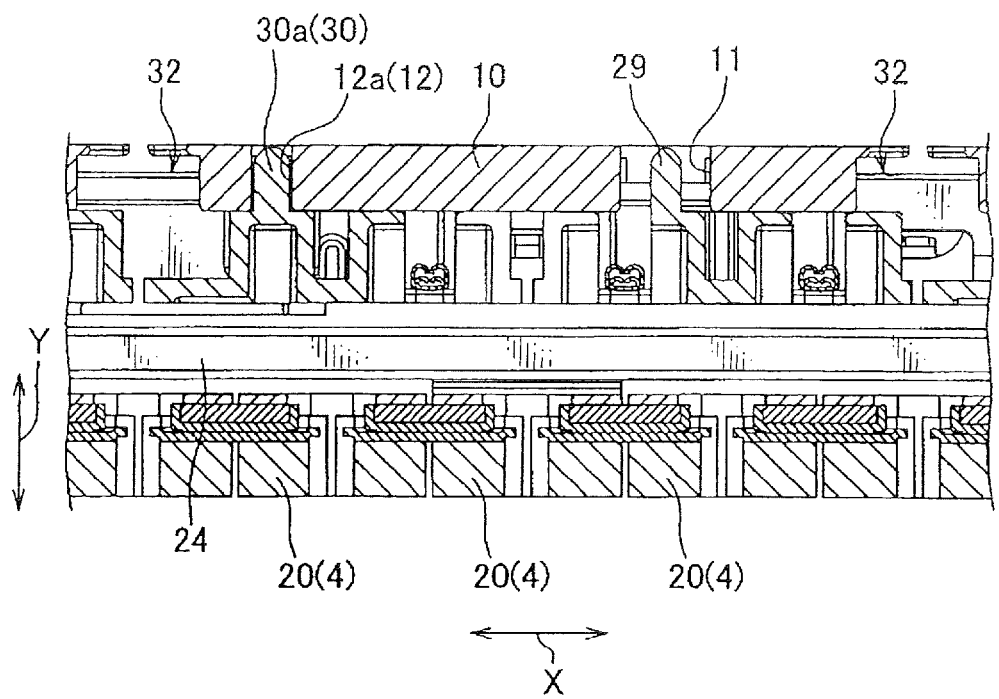
FIG. 6 A sectional view taken on line VI-VI in FIG. 5.

As shown in FIGS. 5 and 6, the positioning hole 11 penetrates the cover portion 10, and formed in a rectangular shape in a plan view. A longitudinal direction of the positioning hole 11 is arranged in parallel to the longitudinal direction of the cover portion 10, namely, the overlapping direction X of the batteries 4. That is, a length (whole length) of the positioning hole 11 in the arrow X direction is formed larger than a width of the positioning projection 29 in the arrow X direction. Further, a length (width) of the positioning hole 11 in the arrow Z direction is substantially the same as a width of the positioning projection 29 in the arrow Z direction. In this way, when the positioning projection 29 is inserted into the positioning hole 11, the positioning hole 11 relatively positions the bus bar accommodating portion 25 and the cover portion 10, and allows the positioning projection 29 inserted into the positioning hole 11 to be relatively movable in the overlapping direction X of the batteries 4. Then, even when the bus bar accommodating portions 25 adjacent to each other are moved, and the gaps between the positioning projections 29 and the locking portions 30 provided alternately on the bus bar accommodating portions 25 are varied, the positioning projections 29 are relatively moved in the positioning holes 11 to absorb the variations of the gaps.

As shown in FIGS. 5 and 6, the lock receiving portion 12 includes: a through hole 12a into which the projection 30a of the locking portion 30 is inserted; and an engaging portion 12b with which the engaging projection 30b is engaged. The through hole 12a penetrates the cover portion 10, and is formed in a rectangular shape in a plan view. A longitudinal direction of the through hole 12a is parallel to the width direction of the cover portion 10 (arrow Z direction). That is, a length (width) in the arrow X direction of the through hole 12a is formed substantially the same as a width in the arrow X direction of the projection 30a. Further, a length (whole length) in the arrow Z direction of the through hole 12a is a little larger than a width in the arrow Z direction of the projection 30a and the engaging projection 30b. The engaging portion 12b is formed in a band shape stepping over the through hole 12a in a width direction (arrow X direction) near a wall of the cover portion 10 facing the bus bar accommodating portions 25 and inside of the through hole 12a for engaging with the engaging projection 30b of the locking portion 30.

Further, when the engaging projection 30b of the locking portion 30 is engaged with the engaging portion 12, and the projection 30a of the locking portion 30 is inserted into the through hole 12a, the lock receiving portion 12 is locked with the locking portion 30, thereby the cover portions 10 are fixed to the bus bar accommodating portions 25.

As shown in FIG. 7, the concave 13 is formed by concaving a wall of the cover portion 10 facing the bus bar accommodating portion 25. When the cover portion 10 covers the bus bars 7 accommodated in the two bus bar accommodating portions 25 adjacent to each other, the arc, portion 31b of the connecting portion 31 connecting the two bus bar accommodating portions 25 enters an inside of the concave 13.

As shown in FIG. 5, each of the elastically deforming portions 14 is formed in an oval disc shape and has an opening 15 at the center thereof. Both ends in a width direction of each elastically deforming portion 14 are connected to the cover portions 10 adjacent to each other. Further, when each elastically deforming portion 14 is elastically deformed so that the both ends in the width direction of each elastically deforming portion 14 are moved close to or away from each other, each elastically deforming portion 14 movably connects the cover portions 10 adjacent to each other in the arranging direction of the bus bar accommodating portions 25, namely, the overlapping direction X of the batteries 4.

Further, as shown in FIGS. 5 and 7, when the cover portions 10 cover the bus bars 7 respectively accommodated in the bus bar accommodating portions 25, the elastically deforming portions 14 are positioned to be overlapped with the connecting portions 31 which are not covered by the cover portions 10, and the arc portions 31b of the connecting portions 31 are respectively inserted into the openings 15.

The lid portion 16 is formed in a flat plate shape, and as shown in FIG. 5 1 and 2, connected to the cover portions 10 positioned at one end in the longitudinal direction of the battery assembly 3, namely, the arranging direction of the batteries 4 from among the two columns of the cover portions 10. Further, by covering an opening of the wire routing portion 9, the lid portion 16 prevents the one electric wire connected to the positive electrode 21 of the one 10 battery 4a positioned at the one end in the longitudinal direction X of the battery assembly 3 from falling out of the wire routing portion 9, and isolates a connecting point between the positive electrode 21 of the one battery 4a and the one electric wire from an outside.

In the cover member 1, the cover portions 10 cover the openings of the bus bar accommodating portions 25 adjacent to each other of the main body 8 of the bus bar module 6, and the lid portion 16 covers the opening of the wire routing portion 9 of the bus bar module 6. Further, when the positioning projection 29 provided on the one bus bar accommodating portion 25 of the two bus bar accommodating portions 25 is inserted into the positioning hole 11 of the cover portion 10, the cover portions 10 and the two bus bar accommodating portions 25 are relatively positioned. In addition, when the lock receiving portion 12 of the cover portion 10 is locked with the locking portion 30 provided on the other bus bar accommodating portion 25, the cover portions 10 are fixed to the bus bar accommodating portions 25 to be attached to the bus bar module 6.

Further, when the cover member 1 is attached to the bus bar module 6, the cover portions 10 cover the openings of the bus bar accommodating portions 25, namely, the bus bars 7 accommodated in the bus bar accommodating portions 25 to isolate the bus bars 7 and the positive and negative electrodes 21, 22 of the batteries 4 from an outside. In addition, the lid portion 16 covers the opening of the wire routing portion 9 to isolate the connecting point between the one electric wire arranged in the wire routing portion 9 and the positive electrode 21 of the one battery 4a positioned at one end in the longitudinal direction X of the battery assembly 3 from an outside.

Hereinafter, an assembling method of the power source 2 will be explained. First, as shown in FIG. 2, the bus bars 7 are previously accommodated in the bus bar accommodating portions 25 of the main body 8 of the bus bar module 6. Incidentally, the bus bars 7 may be arranged in the bus bar accommodating portions 25 by insert molding the main body 8. Then, the electric wires for detecting the voltage of the batteries 4 are connected to the bus bars 7 via the terminal 71, and accommodated in the wire accommodation portions 32. Thus, the bus bars 7 and the electric wires for voltage detection (not shown) are installed in the main body 8 of the bus bar module 6.

Next, as shown in FIG. 2, the main body 8 in which the bus bars 7 and the electric wires for voltage detection are installed is set opposite to the upper wall 3a of the battery assembly 3. Then, as the main body 8 is moved close to the battery assembly 3, the bus bar accommodating portions 25 and the wire accommodation portions 32 of the main body 8 are overlapped with the upper wall 3a of the battery assembly 3, and the positive and negative electrodes 21, 22 of the batteries 4 of the battery assembly 3 are inserted into the through holes 26a of the bus bar accommodating portions 25 and the holes 7a of the bus bars 7. At this time, the bus bar module 6 (namely, the columns of the bus bar accommodating portions 25, the columns of the wire accommodation portions 32, and the connection members 28) is expanded or contracted in the longitudinal direction according to the tolerance of the battery assembly 3.

Next, the positive and negative electrodes 21, 22 of the batteries 4 of the battery assembly 3 inserted into the through holes 26a of the bus bar accommodating portions 25 and the holes 7a of the bus bars 7 are screwed with nuts 35 (shown in FIG. 7), thereby the positive and negative electrodes 21, 22 of the batteries 4 and the bus bars 7 are fixed to each other. Thus, the bus bar module 6 is attached to the battery assembly 3, and the batteries 4 of the battery assembly 3 are connected in series.

Then, one electric wire of the pair of electric wires for outputting the voltage of the battery assembly 3 to an outside is connected to the positive electrode 21 of the one battery 4a positioned at one end in the longitudinal direction X of the battery assembly 3, and the other electric wire is connected to the negative electrode 22 of the other battery 4b positioned at the other end in the longitudinal direction X of the battery assembly 3. Then, the one electric wire is positioned in the wire routing portion 9 and guided from the one end to the other end in the longitudinal direction X of the battery assembly 3 along the battery assembly 3.

Then, the cover member 1 is set opposite to a surface of the bus bar module 6, and the cover member 1 is moved close to the bus bar module 6 to be overlapped with the bus bar module 6 so that the cover portions 10 of the cover member 1 cover the openings of the two bus bar accommodating portions 25 adjacent to each other of the main body 8 of the bus bar module 6, and the lid portion 16 of the cover member 1 covers the opening of the wire routing portion 9 of the bus bar module 6.

At this time, in the cover member 1, according to the expansion or contraction of the bus bar module 6, namely, the movements of the bus bar accommodating portions 25 in the arrow X direction, the elastically deforming portions 14 are elastically deformed. Further, the positioning projection 29 is inserted into the positioning hole 11 of the cover portion 10, and the positioning projection 29 is relatively moved in the positioning hole 11 to adjust a mounting position (namely, positioning). Further, at the same time, the projection 30a of the locking portion 30 is inserted into the through hole 12a of the lock receiving portion 12 of the cover portion 10 so that the engaging portion 12b and the engaging projection 30b are engaged with each other (namely, locked with each other).

In this way, as shown in FIG. 6, by inserting the positioning projection 29 provided on the one bus bar accommodating portion 25 of the two bus bar accommodating portions 25 into the positioning hole 11 of the cover portion 10, the cover portion 10 and the two bus bar accommodating portions 25 are relatively positioned. Further, by locking the lock receiving portion 12 of the cover portion 10 with the locking portion 30 provided on the other bus bar accommodating portion 25, the cover portion 10 is fixed to the two bus bar accommodating portions 25.

Further, at this time, as shown in FIG. 4, the arc portion 31b of the connecting portion 31 connecting the two bus bar accommodating portions 25 adjacent to each other of which openings are covered by the cover portion 10 enters an inside of the concave 13 of the cover portion 10. Further, the arc portion 31b of the connecting portion 31 which is not covered by the cover portion 10 is inserted into the opening 15 of the elastically deforming portion 14 of the cover member 1.

In this way, by attaching the cover member 1 to the bus bar module 6, the cover portions 10 of the cover member 1 cover the openings of the bus bar accommodating portions 25 of the main body 8 of the bus bar module 6, namely, the bus bars 7 accommodated in the bus bar accommodating portions 25 to isolate the bus bars 7 and the positive and negative electrodes 21, 22 of the batteries 4 from an outside. Further, the lid portion 16 of the cover member 1 covers the opening of the wire routing portion 9 to isolate the connection point between the one electric wire disposed in the wire routing portion 9 and the positive electrode 21 of the one battery 4a positioned at one end in the longitudinal direction X of the battery assembly 3.

As described above, after the whole bus bar module 6 is overlapped with the battery assembly 3 and attached to the battery assembly 3, a pair of electric wires (not shown) is respectively connected to the batteries 4a, 4b of the battery assembly 3, and the cover member 1 is attached to the bus bar module 6, thereby the power source 2 is assembled.

According to this embodiment, the cover portions 10 arranged in parallel in the overlapping direction X of the batteries 4 of the battery assembly 3 and covering the bus bars 7 are movably connected to each other with the elastically deforming portions 14. Therefore, even when the gaps between the locking portions 30 are varied due to the variation of the length of the main body 8 of the bus bar module 6, the cover portions 10 can be moved in the overlapping direction X of the batteries 4 of the battery assembly 3 according to these variations. Thereby, even when the length of the bus bar module 6 is varied due to a tolerance absorption or the like, and the lock receiving portions 12 of the cover portions 10 and the locking portions 30 of the bus bar module 6 are dislocated, by moving the cover portions 10 in the overlapping direction of the batteries 4 of the battery assembly 3, the locking portions 30 and the lock receiving portions 12 can be easily locked with each other. Therefore, the cover member 1 can be easily attached to the bus bar module 6 mounted on the battery assembly 3 having a large accumulating tolerance.

Further, each of the cover portions 10 includes: the positioning hole 11 into which the positioning projection 29 of the bus bar module 6 is inserted; and the lock receiving portion 12 with which the locking portion 30 of the bus bar module 6 is locked, and the positioning hole 11 is formed in a shape to allow the positioning projection 29 to be movable in the overlapping direction X of the batteries 4 of the battery assembly 3. Therefore, while the locking portion 30 and the positioning projection 29 provided on the main body 8 are engaged with the one cover portion 10, even when the gap between the locking portion 30 and the positioning projection 29 is varied, the positioning projection 29 is moved in the positioning hole 11 according to this variation. Therefore, a tolerance can be absorbed without a complex structure such as an elastically deforming portion allowing the lock receiving portion 12 and the positioning hole 11 to be movable provided on the one cover portion 10, the locking portion 30 and the lock receiving portion 12 are correctly locked with each other, and easily attached to the bus bar module 6.

Further, when the cover member 10 is attached to the bus bar module mounted on the battery assembly 3 having a large cumulative tolerance, the tolerance is absorbed not only by the elastically deforming portions 14 connecting the cover portions 10 movably but also by the positioning holes 11 of the cover portions 10. Therefore, the number of the elastically deforming portions 14 can be reduced, and a shape of the cover member 1 can be prevented from being complex. Therefore, the cover member 1 can be easily produced, and the production cost of the cover member can be reduced.

Further, the elastically deforming portions 14 respectively include: openings 15 respectively overlapped with the connection portions 31 connecting the bus bar accommodating portions 25 adjacent to each other respectively accommodating the bus bars 7 and into which arc portions (tip ends) 31b of the connection portions 31 are respectively inserted when the cover portions 10 cover the bus bars 7. Therefore, a height of the cover member 1 attached to the bus bar module 6 can be reduced.

Further, each of the cover portions 10 includes: a concave 13 covering the bus bar 7 accommodated in two accommodating portions 25 adjacent to each other of the accommodating portions 25, and having a wall facing the two accommodating portions 25 which a tip end 31b of the connecting portion 31 connecting the two accommodating portions 25 enters. Therefore, the height of the cover member 1 attached to the bus bar module 6 can be further reduced.

Further, because the power source 2 of this embodiment includes the cover member 1 described above, the cover member 1 can be attached easily to the bus bar module 6 mounted on the battery assembly 3 having a large cumulative tolerance, and the assembling workability can be increased. Further, a shape of the cover member 1 can be prevented from being complex, the cover member 1 can be easily produced, and the production cost of the cover member 1 can be reduced. Thereby, the production cost of the power source 2 can be reduced. Further, because the height of the cover member 1 attached to the bus bar module 6 can be reduced, the power source 2 can be downsized.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A cover member attached to a bus bar module which comprises:
   a plurality of bus bars connecting a plurality of batteries in series by connecting adjacent batteries of the plurality of batteries to each other, forming a battery assembly composed of the connected plurality of batteries, the plurality of batteries being overlapped with each other, such that first side walls of each of the batteries are aligned substantially coplanarly;
   a main body attached to the plurality of bus bars, and overlapped with the battery assembly;
   a plurality of positioning projections projected from the main body; and
   a plurality of locking portions provided on the main body,
   said cover member comprising:
   a plurality of cover portions arranged in parallel to an overlapping direction of the plurality of batteries, and covering the plurality of bus bars, the plurality of cover portions separated by gaps; and
   a plurality of elastically deforming portions, disposed within the gaps, the plurality of elastically deformable members movably connecting cover portions adjacent to each other within the plurality of cover portions,
   wherein each of said cover portions comprises:
      a positioning hole into which each of the positioning projection is inserted and formed in a shape to allow the positioning projection to be movable in the overlapping direction of the plurality of batteries; and
      a lock receiving portion with which the plurality of locking portions is locked.

2. The cover member as claimed in claim 1, wherein the main body includes:
   a plurality of accommodating portions arranged in parallel to the overlapping direction of the plurality of batteries and respectively receiving the plurality of bus bars; and
   a plurality of connection portions projected toward the cover member and connecting adjacent accommodating portions of the plurality of accommodating portions, and
   wherein the elastically deformable members respectively include: openings respectively overlapped with the plurality of connection portions so as to insert tip ends of the connection portions therethrough when the cover portions cover the plurality of bus bars.

3. The cover member as claimed in claim 2, wherein the plurality of cover portions covers the plurality of bus bars received in two adjacent accommodating portions of the plurality of accommodating portions, and includes:
   a concave provided at a wall of the plurality of cover portions facing the two adjacent accommodating portions so as to insert the tip end of a connecting portion of the plurality of connection portions connecting the two adjacent accommodating portions.

4. The cover member as claimed in claim 1, wherein a total length of the positioning hole is made longer than a first width of the poisoning projection and a width of the positioning hole is made substantially equal to a second width of the positioning projection so as to allow the positioning projection in an engaged state to be movable in the overlapping direction of the batteries.

5. A power source comprising:
   the battery assembly composed of the plurality of batteries overlapped with each other;
   wherein the bus bar module is attached to the battery assembly, and connects the batteries of the battery assembly in series; and
   the cover member claimed in claim 1 attached to the bus bar module.

6. A power source comprising:
   the battery assembly composed of the plurality of batteries overlapped with each other;
   wherein the bus bar module is attached to the battery assembly, and connects the batteries of the battery assembly in series; and
   the cover member claimed in claim 2 attached to the bus bar module.

7. A power source comprising:
   the battery assembly composed of the plurality of batteries overlapped with each other;

wherein the bus bar module is attached to the battery assembly, and connects the batteries of the battery assembly in series; and the cover member claimed in claim 3 attached to the bus bar module.

* * * * *